United States Patent
Cecola et al.

(10) Patent No.: US 11,879,046 B2
(45) Date of Patent: Jan. 23, 2024

(54) SYSTEM AND METHOD FOR MAKING TEXTURED FOAM THAT SIMULATES HUMAN FINGERPRINTS

(71) Applicant: Universal Brands, LLC, Lake Forest, IL (US)

(72) Inventors: Alexander Cecola, Manhattan Beach, CA (US); Sophia Cecola, Lake Forest, IL (US)

(73) Assignee: Universal Brands, LLC, Lake Forest, IL (US)

( * ) Notice: Subject to any disclaimer, the term of this patent is extended or adjusted under 35 U.S.C. 154(b) by 292 days.

(21) Appl. No.: 17/328,619

(22) Filed: May 24, 2021

(65) Prior Publication Data

US 2022/0041832 A1 Feb. 10, 2022

Related U.S. Application Data

(63) Continuation of application No. 16/928,454, filed on Jul. 14, 2020, now Pat. No. 11,046,829.

(51) Int. Cl.
| | |
|---|---|
| *B25G 1/10* | (2006.01) |
| *B29C 59/04* | (2006.01) |
| *C08J 9/224* | (2006.01) |
| *B29C 51/42* | (2006.01) |
| *C08J 9/36* | (2006.01) |

(52) U.S. Cl.
CPC ............ *C08J 9/224* (2013.01); *B29C 51/421* (2013.01); *C08J 9/36* (2013.01); *C08J 2201/026* (2013.01); *C08J 2205/052* (2013.01); *C08J 2207/00* (2013.01); *C08J 2323/06* (2013.01); *C08J 2323/08* (2013.01)

(58) Field of Classification Search
CPC ........ C08J 9/224; C08J 9/36; C08J 2201/026; C08J 2205/052; C08J 2207/00; C08J 2323/06; C08J 2323/08; B29C 51/421; B29C 44/5627
See application file for complete search history.

(56) References Cited

U.S. PATENT DOCUMENTS

| | | | | |
|---|---|---|---|---|
| 6,299,962 B1 * | 10/2001 | Davis | .................... | B29C 33/306 |
| | | | | 36/129 |
| 2002/0108483 A1 | 8/2002 | Smith | | |
| 2006/0107552 A1 | 5/2006 | Clark | | |

FOREIGN PATENT DOCUMENTS

| | | | |
|---|---|---|---|
| JP | H9209206 | * | 8/1997 |
| JP | 2000089908 | * | 3/2000 |
| WO | WO0249859 A2 | | 6/2002 |

* cited by examiner

*Primary Examiner* — Irina S Zemel
(74) *Attorney, Agent, or Firm* — Eric Kelly

(57) ABSTRACT

A section of (cured and non-liquid) textured foam includes at least a portion of an upper surface that substantially resembles a look of a human fingerprint for a purpose of providing enhanced grip traction between the at least the portion of the upper surface of the textured foam and a hand or a foot of a user of the textured foam. Disposed opposite of the upper surface of the textured foam may be an adhesive backing for attachment to a diverse variety of exterior surfaces where improved grip traction are desired. Systems and methods for making such textured foam that substantially resembles a look of a human fingerprint may utilize a heating means and a compression means.

20 Claims, 13 Drawing Sheets

US 11,879,046 B2

SYSTEM AND METHOD FOR MAKING TEXTURED FOAM THAT SIMULATES HUMAN FINGERPRINTS

PRIORITY NOTICE

The present patent application is a continuation of U.S. non-provisional patent application Ser. No. 16/928,454 filed on Jul. 14, 2020, and claims priority to said U.S. non-provisional patent application under 35 U.S.C. § 120. The above-identified patent application is incorporated herein by reference in its entirety as if fully set forth below.

TECHNICAL FIELD OF THE INVENTION

The present invention relates in general to making foam with textured surfaces and more specifically to making foam with textured surfaces, wherein the textured surfaces are intended to mimic human fingerprint patterns.

COPYRIGHT AND TRADEMARK NOTICE

A portion of the disclosure of this patent application may contain material that is subject to copyright protection. The owner has no objection to the facsimile reproduction by anyone of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is by way of example and should not be construed as descriptive or to limit the scope of this invention to material associated only with such marks.

BACKGROUND OF THE INVENTION

Traction grip (grip traction) may refer to an extent of friction between: a hand (or glove) and an article that the hand (glove) is engaging with; and/or a foot (or footwear) and a surface (e.g., a floor) that the foot (footwear) is standing on (or pushing against). Increased, enhanced, and/or good traction grip may be important for a number of activities; particularly in slippery (e.g., wet) environments. Activities where good grip traction may be important can be as mundane as simple walking, standing, or sitting. Slippery floors and/or walkways give rise to serious injuries every day. Or for more complicated activities, such as sports and/or use of tools, good grip traction may be critical (for a desired outcome and/or in avoiding injury). Water sports (e.g., surfing) and snow sports (e.g., snowboard) in particular often involve slippery elements, where friction may be needed to be increased.

A number of products have been developed and introduced over the years to increase grip traction (increase friction), particularly in what might otherwise be slippery conditions. Examples of such products include stomp pads, grip tapes, grip sprays, and paints with abrasive ingredients. Examples of stomp pads, grip tapes, and grip sprays are shown as prior art in FIG. 1A through and including FIG. 1E, respectively.

Stomp pads are often a relatively thin layer of foam, with an adhesive backing, used to stick to some surface where one wants to increase grip traction (e.g., a top deck of a surfboard). The upper/top layer of the foam of a stomp pad may have shaped into various patterns and/or textures; however, to date have not been textured and/or shaped to simulate and/or resemble a look of human fingerprints.

Grips tapes are typically a layer of adhesive backing on a bottom side and either an abrasive gritty upper side or a foam/rubbery upper side. The adhesive backing of grip tapes, like stomp pads, is stuck to some surface where increased grip traction is desired (e.g., on the top of stair steps or skateboards). However, to date, grip tapes have not been textured and/or shaped to simulate and/or resemble a look of human fingerprints.

Grip sprays are sprayed from a spray can onto some surface where increase grip traction is desired. A cured grip spray, after being sprayed onto a surface, may yield a surface that is gritty, tacky, or foamy/rubbery; and are thus in many ways similar to grip tapes. The cured surface from grip spray is not textured and/or shaped to simulate and/or resemble a look of human fingerprints.

Paints may be formulated to include abrasive ingredients (e.g., sand or the like) to yield a painted surface that may have increased grip traction. For example, gel coats on upper exterior surfaces of boats often include granules of some abrasive within the gel coat to increase grip traction to minimize falling. Again, such applied paints (gel coats) are not textured and/or shaped to simulate and/or resemble a look of human fingerprints.

The above abrasive based grip traction products are not that suitable for providing grip traction with naked human skin, as the abrasive qualities may harm the human skin. That is, the above abrasive based grip traction products are often used in applications where one is wearing footwear to protect the foot from abrasion damage. It would be desirable to implement a grip traction product without abrasive qualities that could be used with naked human skin without harming the human skin.

The above noted foam based grip traction products (e.g., stomp pads) are often excessively thick, often with grooves that exceed 10 millimeters (mm) in depth; and/or wherein the overall foam sheet may an inch or so in height. It may be desirable to implement a grip traction product that may be significantly thinner while providing superior grip traction.

Interestingly, human fingerprints tend to swell some with exposure to water; wherein this marginal swelling of the human fingerprint can increase grip traction in wet environments. Also, a shape and/or texture of human fingerprints may impart enhanced grip traction (e.g., as compared to a smooth surface).

None of the above noted prior art grip traction products emulate this invention and the patterning of the human fingerprints.

There is a need in the art for traction grip products (e.g., a foam based product), wherein at least a portion of an upper surface may be textured, shaped, and/or patterned to simulate and/or resemble a look of human fingerprints.

It is to these ends that the present invention has been developed.

BRIEF SUMMARY OF THE INVENTION

To minimize the limitations in the prior art, and to minimize other limitations that will be apparent upon reading and understanding the present specification, various embodiments of the present invention describe a given section of (cured and non-liquid) textured foam with at least a portion of an upper surface that substantially resembles a look of a human fingerprint, wherein the at least the portion of the upper surface of the textured foam is configured to provide grip traction between the at least the portion of the upper surface and a hand or a foot of a user of the foam. Other embodiments, may describe systems and/or method, utilizing compression means and/or heating means, for making such textured foam that may simulate and/or resemble a look of a human fingerprint.

It is an objective of the present invention to provide a textured foam that may simulate and/or resemble a look of a human fingerprint.

It is another objective of the present invention to provide a textured foam that may simulate and/or resemble a look of a human fingerprint for a purpose of providing grip traction.

It is another objective of the present invention to provide a textured foam that may simulate and/or resemble a look of a human fingerprint for a purpose of providing grip traction in either wet or dry use/operating environments of that textured foam.

It is another objective of the present invention to provide a textured foam that may simulate and/or resemble a look of a human fingerprint, wherein that texture foam may have an adhesive backing for attachment to various exterior surfaces where providing grip traction may be desired and/or useful.

It is another objective of the present invention to provide a textured foam that may simulate and/or resemble a look of a human fingerprint, wherein that texture foam may have an adhesive backing for attachment to various exterior surfaces wherein such attachment results in strengthening the exterior surface that received the textured foam attachment.

It is another objective of the present invention to provide a textured foam that may simulate and/or resemble a look of a human fingerprint, wherein an overall thickness of the textured foam may be relatively thin (e.g., 3 mm to 6 mm).

It is another objective of the present invention to provide a textured foam that may simulate and/or resemble a look of a human fingerprint, wherein the means for manufacturing such a textured foam are relatively simple and cost effective.

It is another objective of the present invention to provide such a textured foam that may simulate and/or resemble a look of a human fingerprint, wherein that textured foam may provide better, improved, and/or enhanced grip traction as compared to prior art grip traction products.

It is yet another objective of the present invention to provide such a textured foam that may simulate and/or resemble a look of a human fingerprint, wherein that textured foam may be thinner, stronger, substantially without abrasives, and that may provide better, improved, and/or enhanced grip traction as compared to prior art grip traction products.

These and other advantages and features of the present invention are described herein with specificity so as to make the present invention understandable to one of ordinary skill in the art, both with respect to how to practice the present invention and how to make the present invention.

BRIEF DESCRIPTION OF THE SEVERAL VIEWS OF THE DRAWINGS

Elements in the figures have not necessarily been drawn to scale in order to enhance their clarity and improve understanding of these various elements and embodiments of the invention. Furthermore, elements that are known to be common and well understood to those in the industry are not depicted in order to provide a clear view of the various embodiments of the invention.

Figure 1A:
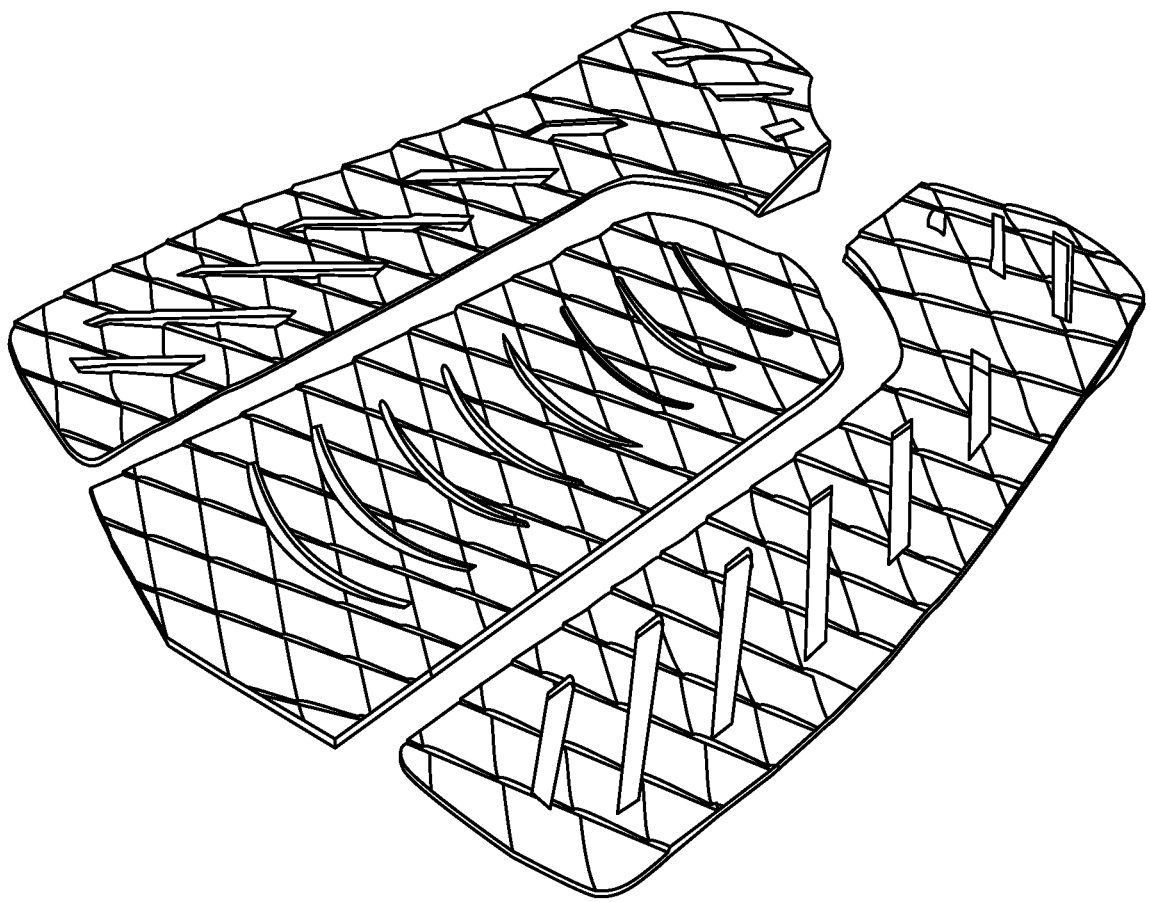
FIG. 1A depicts a generic prior art example of a grip stomp pad to minimize foot slippage.

REFERENCE NUMERAL SCHEDULE 200 foam textured to simulate human fingerprints 200
201 upper surface 201
203 simulated human fingerprint texture and pattern 203
205 foam-base 205
207 adhesive layer 207
209 foam-core 209
211 ridge 211
213 channel 213
215 first-ridge-width 215
217 second-ridge-width 217
219 first-channel-width 219
221 second-channel-width 221
223 ridge-height 223
225 foam-core-height 225
227 foam-height 227
229 ridge-radius 229
231 channel-radius 231
300 method making textured foam simulating human fingerprints 300
301 non-textured foam 301
311 heating means 311
313 examples of heating means 313
321 compression surface with predetermined texture 321
323 examples of compression surfaces 323
331 compression means 331
400 compression roller 400
401 textured surface 401
501 complimentary roller 501
511 direction of roller rotation 511
513 direction of roller rotation 513
515 direction of extrusion 515
611 direction of roller rotation 611
613 direction of roller rotation 613
615 direction of feed 615
627 (non-textured) foam-height 627

DETAILED DESCRIPTION OF THE INVENTION

In the following discussion that addresses a number of embodiments and applications of the present invention, reference is made to the accompanying drawings that form a part thereof, where depictions are made, by way of illustration, of specific embodiments in which the invention may be practiced. It is to be understood that other embodiments may be utilized and changes may be made without departing from the scope of the invention.

Figure 1B:
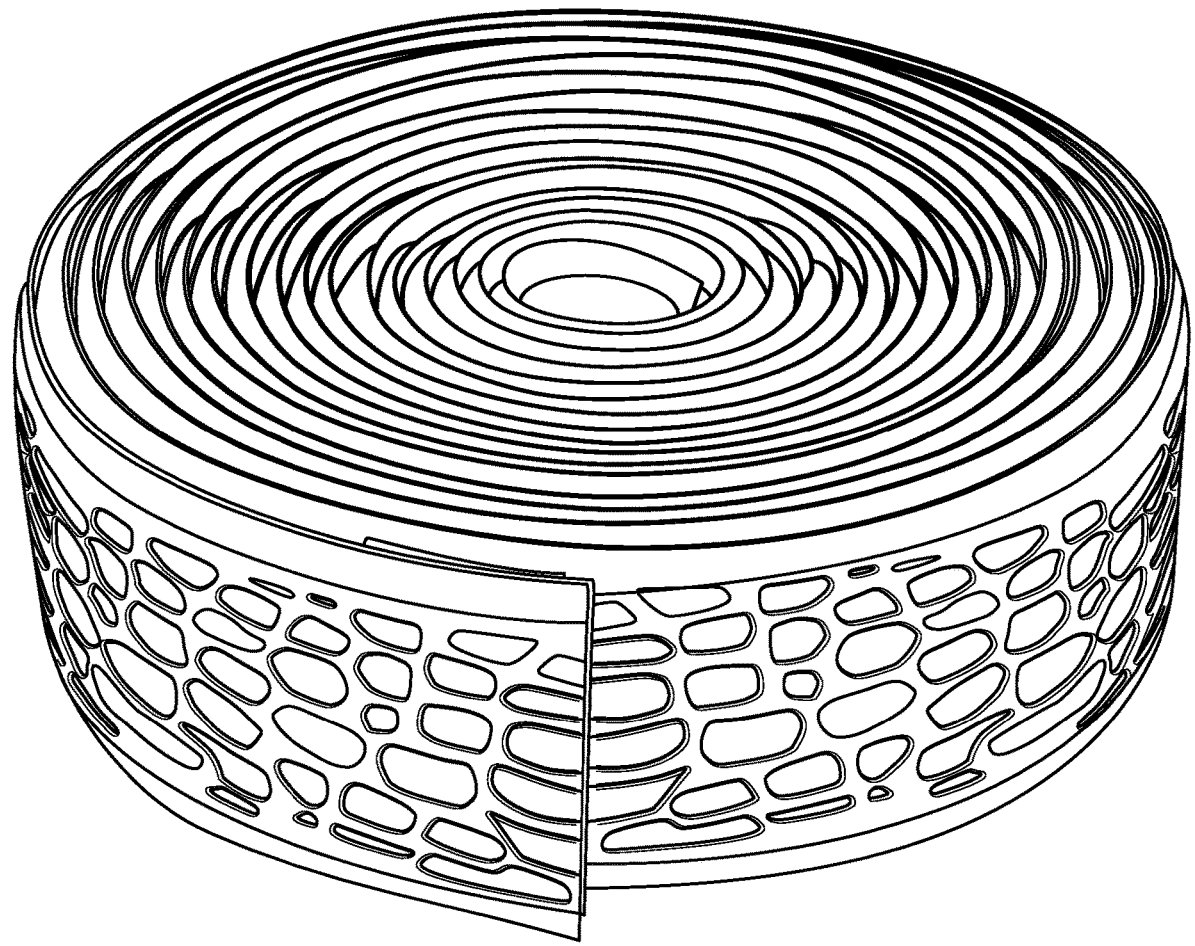
FIG. 1B depicts a generic prior art example of gritty/abrasive type of grip tape to minimize foot slippage.
Figure 1C:
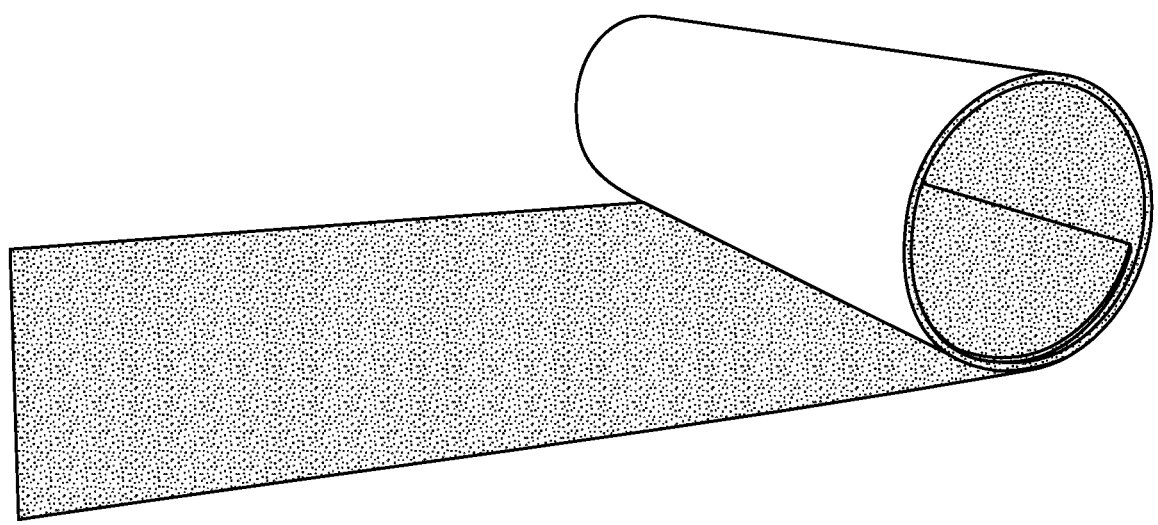
FIG. 1C depicts generic prior art example of a different type of grip tape to minimize hand or foot slippage.
Figure 1D:
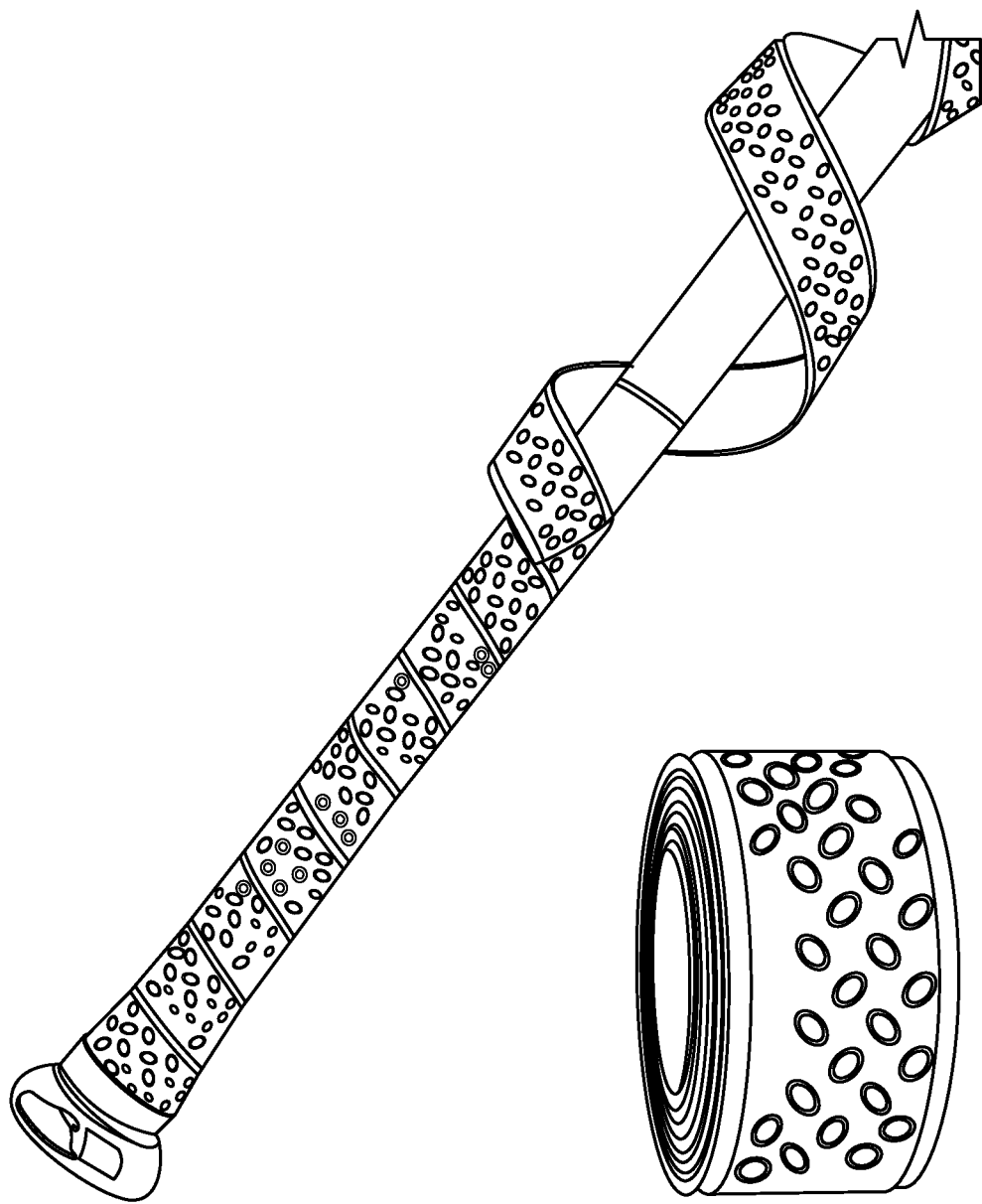
FIG. 1D depicts another generic prior art example of grip tape to minimize hand slippage.
Figure 1E:
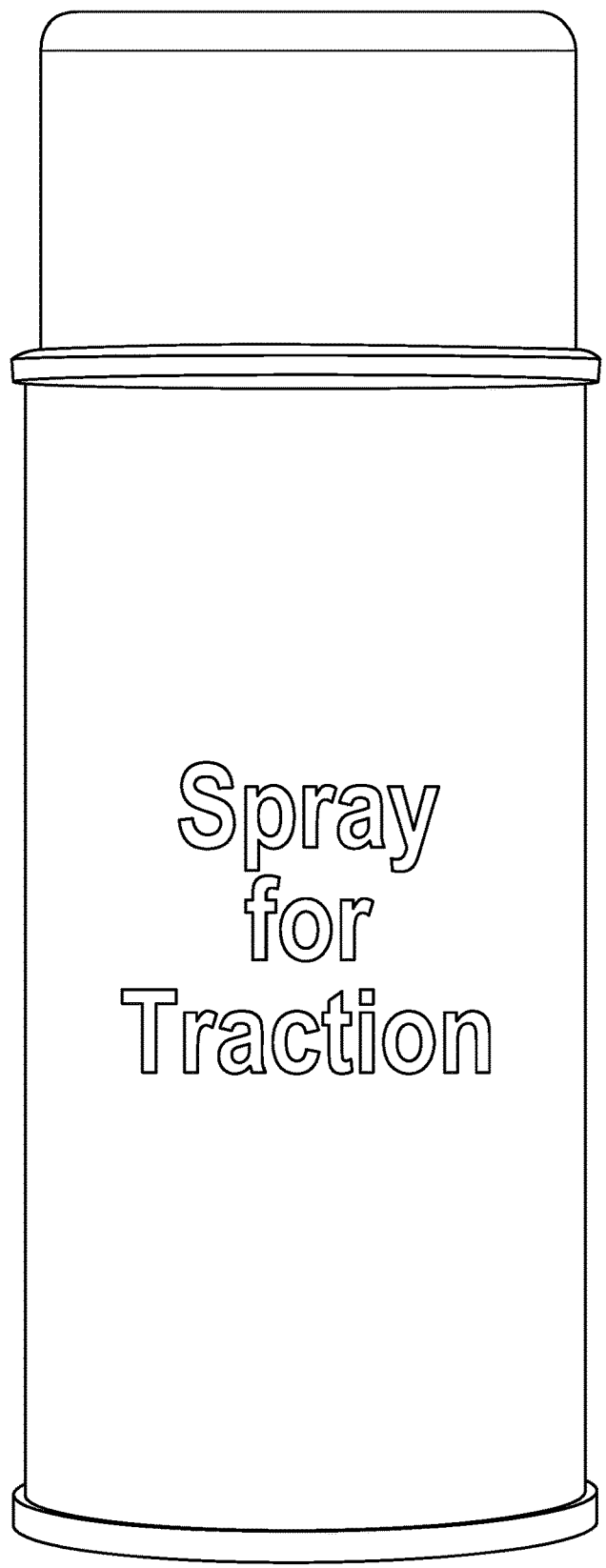
FIG. 1E depicts a generic prior art example of a grip spray, i.e., a spray that may minimize slippage.

FIG. 1A through and including FIG. 1E may depict various prior art examples of products used to impart grip traction, i.e., to minimize slippage at the feet and/or at the hands of a given person and something that the person is interacting with.

FIG. 1A depicts a generic prior art example of a grip stomp pad to minimize foot slippage. Such stomp pads are usually a piece of foam with a texture top and an adhesive bottom, used to stick to the tops of surfboards, paddleboards, skim boards, snowboards, jet skis, wave runners, and the like. Such stomp pads are often used to impart some grip traction between feet and the top of personal water (or snow) craft, such that the feet do not inadvertently slip off of the given personal water (or snow) craft. Such existing stomp pads are not textured to simulate nor resemble a look of human fingerprints.

FIG. 1B depicts a generic prior art example of grip tape to minimize foot slippage. Grip tapes for minimizing foot slippage usually have an adhesive bottom (for sticking to a given substrate) and a gritty, sandpaper like somewhat abrasive top. Such grip tapes are often used on the tops of skateboards and on the tops of stair steps. Such existing grip tapes are not textured to simulate nor resemble a look of human fingerprints.

FIG. 1C depicts generic prior art example of different grip tape to minimize hand or foot slippage. The grip tape of FIG. 1C does not have the abrasive gritty top as compared to the grip tape of FIG. 1B; instead, the grip tape of FIG. 1C has a foam or rubbery top surface, that may be textured. Such existing grip tapes are not textured to simulate nor resemble a look of human fingerprints.

FIG. 1D depicts another generic prior art example of grip tape to minimize hand slippage. This example of grip tape is being used to impart grip traction to a handle of a baseball bat. The grip tape of FIG. 1D has a foam or rubbery top surface, that may be textured. Such existing grip tapes are not textured to simulate nor resemble a look of human fingerprints.

FIG. 1E depicts a generic prior art example of a grip spray, i.e., a spray that may minimize slippage. Such grip sprays are sprayed onto surfaces where it may be desirable to impart increase grip traction. Such existing grip sprays do not yield a grip surface that is textured in a way that simulates or resembles a look of human fingerprints.

Abrasives used to impart grip traction may be applied to various surfaces/substrates in a paint, such as, gel coats used on boats and water craft. Such abrasive including paints and/or gel coats are not textured to simulate nor resemble a look of human fingerprints.

Figure 2A:
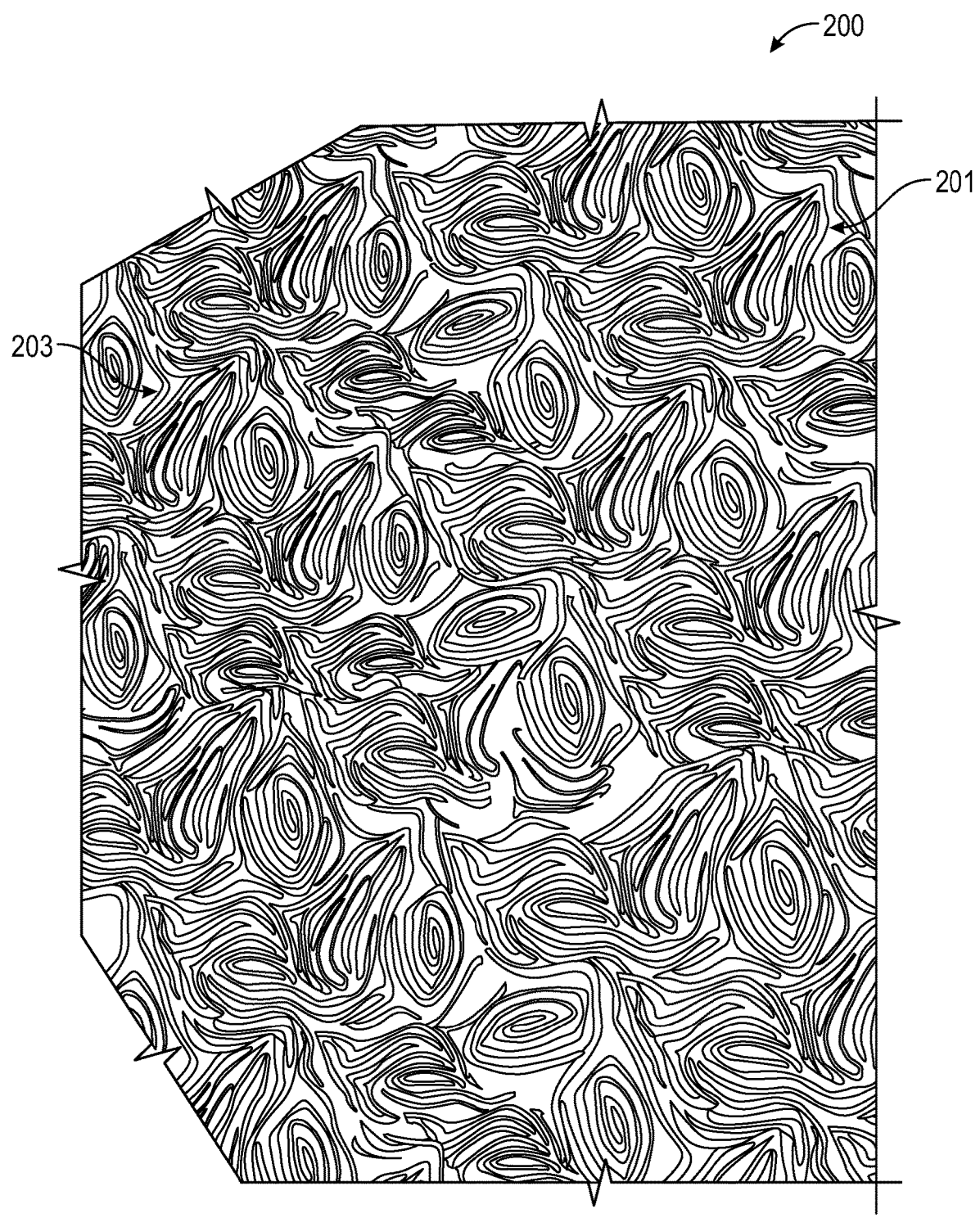
FIG. 2A may depict a top view of a portion of foam that has been textured on an upper surface to simulate (resemble) human fingerprints.

FIG. 2A may depict a top view of a portion of foam 200 that has been textured on an upper surface 201 to simulate (resemble) a look of human fingerprints. In some embodiments, foam 200 may comprise an upper surface 201. In some embodiments, on at least a portion of upper surface 201, may be "simulated human fingerprint texture and pattern 203." In some embodiments, at least a portion of upper surface 201 may comprise simulated human fingerprint texture and pattern 203. In some embodiments, foam 200 may be the inventive output of method 300 (see e.g., FIG. 3 for method 300). In some embodiments, a texture of at least a portion of upper surface 201 may be textured to simulate and/or resemble a texture of human fingerprints. In some embodiments, a pattern of at least a portion of upper surface 201 may be textured to simulate and/or resemble a pattern of human fingerprints.

In some embodiments, foam 200 may be a section of foam with at least a portion of an upper surface 201 that may substantially resemble a look of a human fingerprint, wherein the at least the portion of the upper surface 201 may be configured to provide grip traction between the at least the portion of the upper surface 201 and a hand or a foot of a user of foam 200.

In some embodiments, foam 200 may be a predetermined type of foam and/or combination of foams. In some embodiments, foam 200 may be cured, non-liquid, and non-flowable at room temperatures and/or at most outdoor temperatures. In some embodiments, foam 200 may be selected from one or more of: EVA (closed cell ethylene-vinyl acetate) foams, IXPE (irradiation cross-linked polyethylene) foams, IXPP (irradiated cross-linked polypropylene) foams, EPP (ethylene polypropylene) foams, EPS (expanded polystyrene) foams, XLPE (cross-linked polyethylene) foams, XPE (cross-linked polyethylene resin) foams, PVC (polyvinyl chloride and/or polyurea) foams, closed cell polyethylene foams, Plus Foam, composite foams, laminated foams, high density foams thereof, low density foams thereof, combinations thereof, and/or the like. Note with respect to the materials of construction, it is not desired nor intended to thereby unnecessarily limit the present invention by reason of such disclosure, i.e., in some embodiments, foam 200 may be other types of foam than those disclosed above.

In some embodiments, foam 200 may be one or more of: a sheet of foam; a layer of foam; a veneer of foam; combinations thereof, and/or the like. In some embodiments, a section of foam 200 may be longer or wider than is thick. In some embodiments, a section of foam 200 may be both longer and wider than is thick. In some embodiments, a section of foam 200 may be thinner that is long and/or than is wide.

Figure 2B:
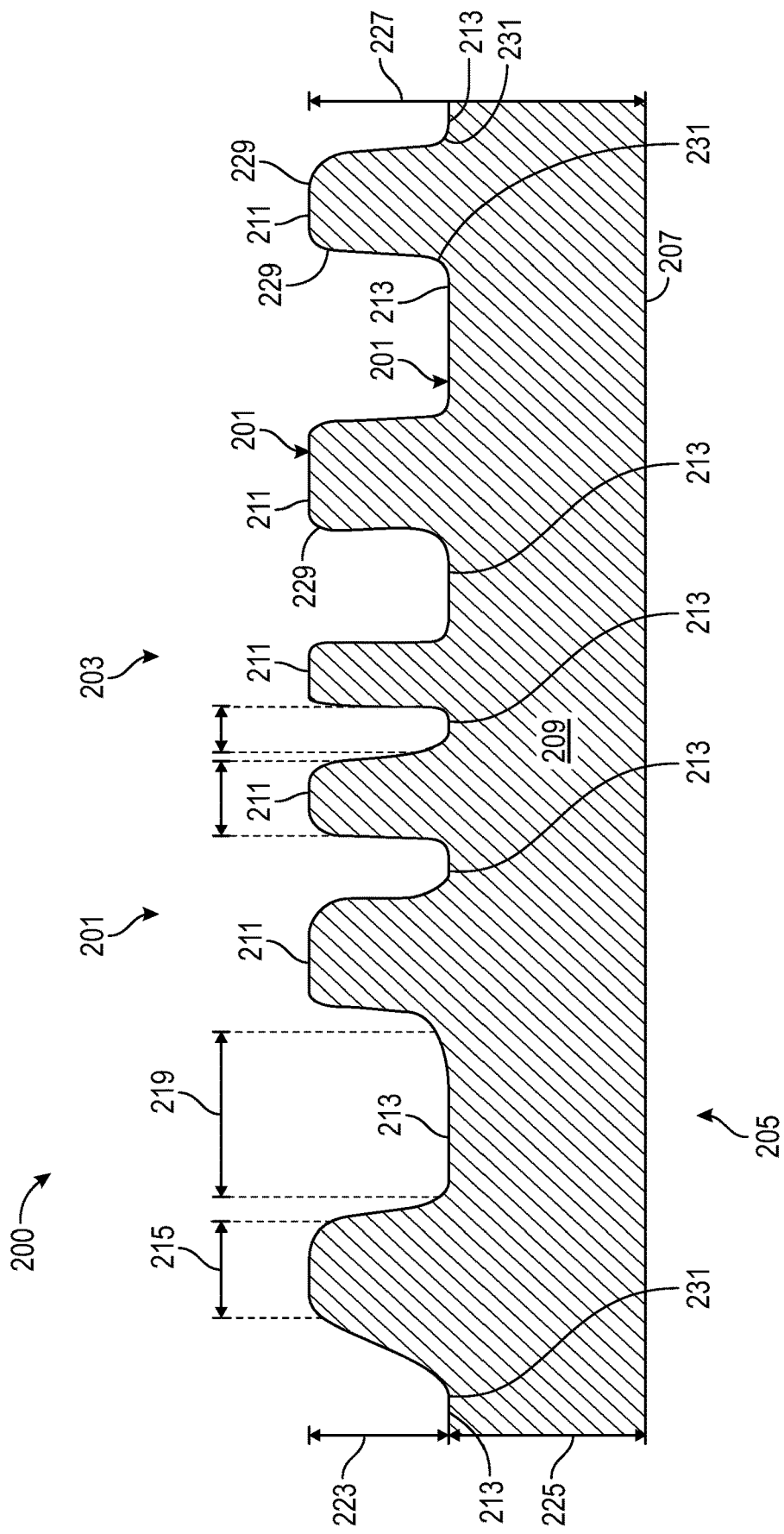
FIG. 2B may depict a close-up cross-section of a portion of foam that has been textured on an upper surface to simulate (resemble) human fingerprints.

FIG. 2B may depict a close-up cross-section of a portion of foam 200 that has been textured on upper surface 201 to simulate (resemble) human fingerprints. In some embodiments, opposing upper surface 201 may be foam-base 205. In some embodiments, foam-base 205 may be substantially flat, planar, smooth, non-textured, combinations thereof, and/or the like. In some embodiments, a bottom exterior of foam-base 205 may be an adhesive layer 207. In some embodiments, adhesive layer 207 may be configured to stick to a predetermined surface (substrate) where it may be desired to increase grip traction. For example, and without limiting the scope of the present invention, adhesive layer 207 may be configured to stick to a predetermined surface (substrate) of a diverse variety of articles/items, such as, but not limited to, exterior surface of: a personal watercraft; a watercraft; a surfboard; a paddleboard; a skim board; a snowboard; skis; water skis; a wakeboard; a kayak; an inflatable kayak; a raft; a jet skis; a wave runner; a boat; a ship; a vessel; a skateboard; a scooter; a handle; a walkway; handholds; cement; concrete; glass; wood; ceramic; a laminate; a composite; a floor; a ground; a tool; an article for sports; portion thereof, combinations thereof, and/or the like.

Note, the exterior surface of the article/item that foam 200 is being attached to, via adhesive layer 207, may be on a top, side, front, back/rear, and/or bottom, of the article/item that foam 200 is being attached to.

Note, attaching foam 200 (via adhesive layer 207) to such an article/item also increases a strength of given article/item that is receiving the section of foam 200.

Continuing discussing FIG. 2B, in some embodiments, disposed between upper surface 201 and foam-base 205 may be a foam-core 209. In some embodiments, foam-core 209 may be a region/portion of foam 200 that is not textured nor patterned to simulate (resemble) a look of human fingerprints. In some embodiments, a bottom of 209 may be foam-base 205. In some embodiments, adhesive layer 207 may be attached to foam-base 205. In some embodiments, above foam-core 209 may be portions/regions of foam 200 that are textured and/or patterned to simulate and/or resemble a look of human fingerprints.

A look of human fingerprints may be characterized a random and/or asymmetrical pattern of whorls made up of alternating ridges and channels (troughs), wherein widths of different ridges may be different and widths of different channels may be different. The ridges and/or channels may be curved. The ridges and/or channels may be branch. Proteins of human skin, such as collagen and/or keratin, may absorb some water and swell a bit when wet with water, which can enhance grip traction in wet environments.

Continuing discussing FIG. 2B, in some embodiments, disposed above foam-core 209 may be a plurality of raised ridges 211 with alternating channels 213 (i.e., grooves, troughs, furrows, or the like). In some embodiments, disposed above foam-core 209 may be a plurality of alternating ridges 211 and channels 213. In some embodiments, the plurality of alternating ridges 211 and channels 213 may be configured to simulate and/or resemble a look of human fingerprints. In some embodiments, the plurality of alternating ridges 211 and channels 213 may substantially resemble the look of the human fingerprint. In some embodiments, the plurality of alternating ridges 211 and channels 213 may substantially resemble the look of the human fingerprint with respect to a visual pattern of the human fingerprint. In some embodiments, the plurality of alternating ridges 211 and channels 213 may substantially resemble the look of the human fingerprint with respect to a texture of the human fingerprint. In some embodiments, the plurality of ridges 211 and channels 213 may be organized to simulate and/or resemble a look of human fingerprints. In some embodiments, the plurality of ridges 211 and channels 213 may be structured to simulate and/or resemble a look of human fingerprints. In some embodiments, the plurality of ridges 211 and channels 213 may be shaped to simulate and/or resemble a look of human fingerprints. In some embodiments, the plurality of ridges 211 and channels 213 may be textured to simulate and/or resemble a look of human fingerprints. In some embodiments, the plurality of ridges 211 and channels 213 may be patterned to simulate and/or resemble a look of human fingerprints. In some embodiments, the plurality of ridges 211 and channels 213 may be organized, structured, and/or shaped in a predetermined, but random and/or asymmetrical pattern of whorls. In some embodiments, a given ridge 211 and/or a given channel 213 may be curved and/or may branch (similar to some human fingerprints). In some embodiments, at least some of the plurality of alternating ridges 211 and channels 213 may be curved and branch (similar to some human fingerprints). In some embodiments, at least some of the plurality of alternating ridges 211 and channels 213 may curve into a whorl pattern(s) (similar to some human fingerprints).

Continuing discussing FIG. 2B, in some embodiments, a given ridge 211 may comprise a ridge-width. In some embodiments, a given channel 213 may comprise a channel-width. In some embodiments, a majority of widths (ridge-widths) of ridges 211 may be longer than a majority of widths (channel-widths) of channels 213, wherein both the ridges 211 and the channels 213 are selected from the plurality of alternating ridges 211 and channels 213. In some embodiments, at least some of widths (ridge-widths) of ridges 211 are different (with respect to each other), wherein these ridges 211 are selected from the plurality of alternating ridges 211 and channels 213. In some embodiments, at least some of widths (channel-widths) of channels 213 are different (with respect to each other), wherein such channels 213 are selected from the plurality of alternating ridges 211 and channels 213. In some embodiments, a ridge-width of one ridge 211 may be different from a ridge-width of another different ridge 211. For example, and without limiting the scope of the present invention, a first-ridge-width 215 of one ridge 211 may be different (e.g., larger) than a second-ridge-width 217 of a different ridge 211. In some embodiments, a channel-width of one channel 213 may be different from a channel-width of another different channel 213. For example, and without limiting the scope of the present invention, a first-channel-width 219 of one channel 212 may be different (e.g., larger) than a second-channel-width 221 of a different channel 213.

Continuing discussing FIG. 2B, in some embodiments, a given ridge 211 may have a ridge-height 223. In some embodiments, a given channel 213 may have a depth defined by ridge-height 223. In some embodiments, foam-core 209 may have a foam-core-height 225. In some embodiments, foam 200 may have an overall foam-height 227. In some embodiments, foam-height 227 may be combination of ridge-height 223 and foam-core-height 225.

In some embodiments, a ridge-height 223 range of 0.15 millimeters (mm) to 0.85 mm, plus or minus 0.05 mm, has been shown to provide good, improved, and/or enhanced grip traction (and in wet or dry use conditions). In some embodiments, ridge-height 223 may be within a range of 0.15 millimeters (mm) to 0.85 mm, plus or minus 0.05 mm. In some embodiments, ridge-height 223 may be within a range of 0.25 mm to 0.35 mm, plus or minus 0.05 mm. In other embodiments, ridge-height 223 may be other depths/heights.

In some embodiments, foam-height 227 may be within a range of three (3) millimeters (mm) to six (6) mm, plus or minus one mm. In some embodiments, foam-height 227 may be within a range of four (4) mm to five (5) mm, plus or minus one mm.

Continuing discussing FIG. 2B, in some embodiments, a given ridge 211 may have a predetermined ridge-radius 229. In some embodiments, a ridge-radius 229 of one ridge 211 may be different from a ridge-radius 229 of another different ridge 211. In some embodiments, a given channel 213 may have a predetermined channel-radius 231. In some embodiments, a channel-radius 231 of one channel 213 may be different from a channel-radius 231 of another different channel 213.

Figure 2C:
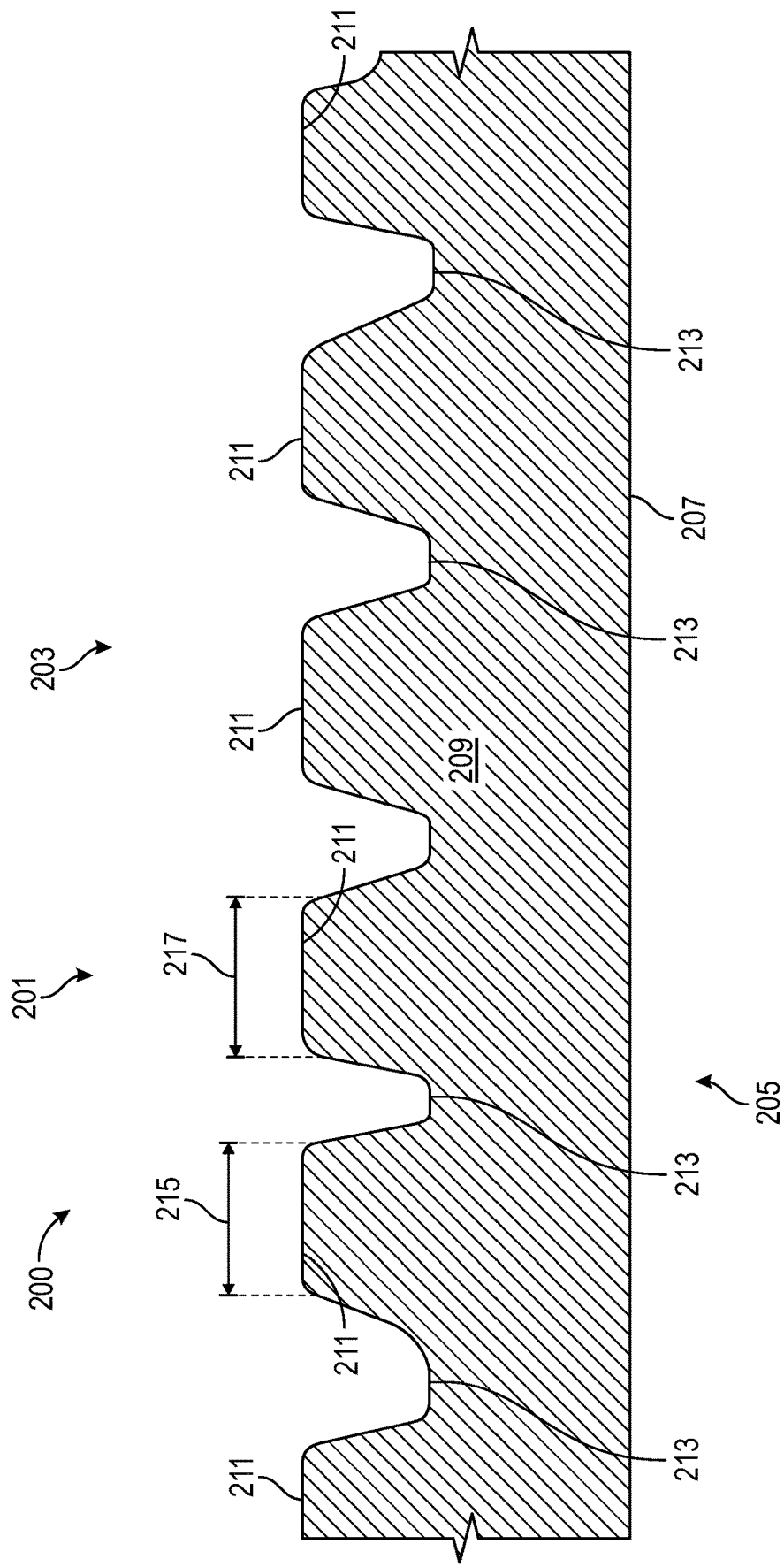
FIG. 2C may depict a close-up cross-section of a portion of foam that has been textured on an upper surface to simulate (resemble) human fingerprints.

FIG. 2C may depict a close-up cross-section of a portion of foam 200 that has been textured on upper surface 201 to simulate (resemble) human fingerprints. In some embodiments, the section/portion of foam 200 shown in FIG. 2C may be a different region of foam 200 than that shown in FIG. 2B. In some embodiments, the section/portion of foam 200 shown in FIG. 2C may be an entirely different segment of foam 200 than that shown in FIG. 2B. In some embodiments, in at least some regions/section of a given segment of foam 200, the ridges 211 may be wider than that the corresponding widths of channels 213, which may be representative of some portions of human fingerprints.

Note a given section of foam 200 may be cut and/or shaped into a variety of predetermined shapes and/or patterns.

Note, a given section of foam 200 (that has been textured to simulate and/or resemble a look of a human fingerprint), and that has a thickness (foam-height 227) of three (3) mm to six (6) mm, has significantly better grip traction as compared to sections of non-textured EVA and/or IXPE foam 301 that have not been textured to simulate and/or resemble a look of a human fingerprint and that have a thickness from three (3) mm to fifteen (15) mm.

Note, a given section of foam 200 (that has been textured to simulate and/or resemble a look of a human fingerprint), and that has a thickness (foam-height 227) of three (3) mm to six (6) mm, has good, enhanced, and/or improved grip traction, as compared to prior art grip tractions products noted herein.

Note, a given section of foam 200 (that has been textured to simulate and/or resemble a look of a human fingerprint), and that has a thickness (foam-height 227) of three (3) mm to six (6) mm, has good, enhanced, and/or improved grip traction, in wet and/or in dry operating environments.

Figure 3:
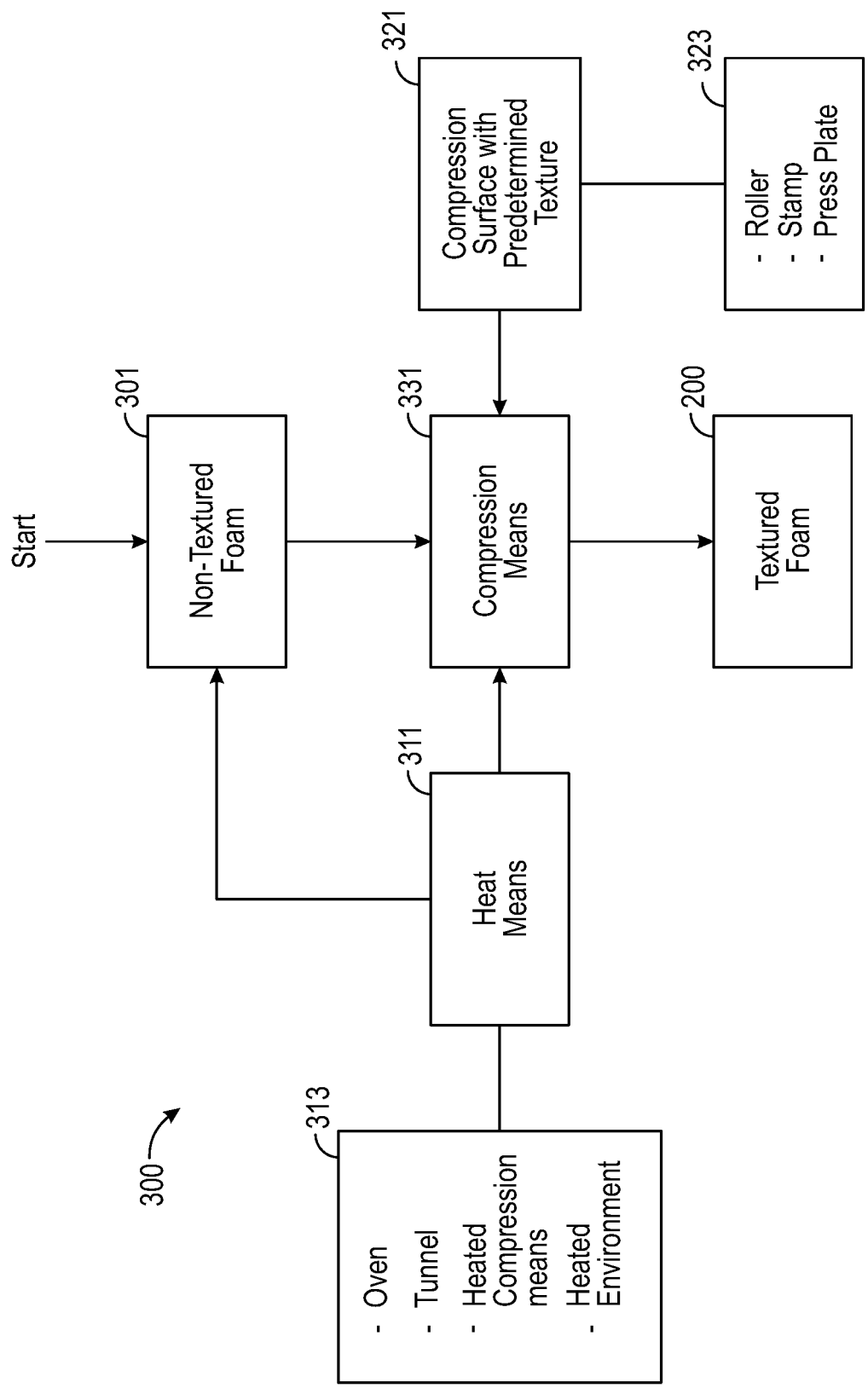
FIG. 3 may depict some steps in a method for making foam that has been textured on an upper surface to simulate (resemble) human fingerprints.

FIG. 3 may depict a process flow in a method 300 for making foam 200 that has been textured on an upper surface 201 to simulate and/or resemble a look of human fingerprints. In some embodiments, method 300 may comprise treating non-textured foam 301 with both a compression means 331 and a heat means 311 to yield textured foam 200. In some embodiments, the compression means 331 may comprise a "compression surface with a predetermined texture and/or pattern 321." In some embodiments, the compression surface may be selected from one or more of: a roller 400, a stamp, a press plate, an embossing plate, portions thereof, combinations thereof, and/or the like. A roller 400, a stamp, and/or a press plate may be examples of compression surfaces 323 used in method 300. In some embodiments, at least some exterior surface of the roller 400, the stamp, and/or the press plate may be textured and/or patterned to simulate and/or resemble human fingerprints (e.g., textured surface 401 of roller 400). In some embodiments, examples 313 of the heat means 311 may comprise one or more of: an oven; a heated conveyor tunnel; a heatable room, a heatable controlled space, a heat gun, a heat bag, a space heater, a furnace, a water heater, a radiator, a radiant heat panel, a heat mat, heat tape, heat cable, a heating element, a ceramic heat emitter, a light bulb configured to emit heat, a heater, a heat exchanger, a heated compression means; a heated environment where the compression means 331 may be occurring; combinations thereof, and/or the like. In some embodiments, the compression means 331 and/or the non-textured foam 301 may be heated by one or more of: a furnace, a space heater, a heat gun, heat bag, a heater, a solar heater, an oven, a tunnel, a radiant panel heater, a heating element, a ceramic heat emitter, a light bulb configured to emit heat, a water heater, a radiator, heat exchanger, combinations thereof, and/or the likes. For example, and without limiting the scope of the present invention, the compression means 331 may be occurring within the oven, the heated conveyor tunnel; a heated room; a heated controlled space, combinations thereof; and/or the like. For example, and without limiting the scope of the present invention, the compression means 331 itself may be heated (e.g., a heated roller 400, a heated stamp, a heated press plate, and/or the like.

Continuing discussing FIG. 3, in some embodiments, method 300 may be a method for making a section of textured foam 200 with at least a portion of an upper surface 201 that substantially resembles a look of a human fingerprint. In some embodiments, the at least the portion of the upper surface 201 is configured to provide grip traction between the at least the portion of the upper surface 201 and a hand or a foot of a user of the textured foam 200. In some embodiments, method 300 may comprise compressing a section of non-textured foam 301 with a compression means 331. In some embodiments, the compression means 331 may comprise a textured imprinting surface 321 with a negative image that substantially resembles the look of the fingerprint for imprinting an inverse (reverse image and/or the positive image) of the negative image onto at least a portion of a top surface of the non-textured foam 301. In some embodiments, an output of such this compression step, using compression means 331, may be the at least the portion of the upper surface 201 of the textured foam 200 that substantially resembles the look of the human fingerprint. In some embodiments, this compression step (via compression means 331) may occur simultaneously (concurrently) with a heating step, via heating means 311, wherein the heating step provides heat to the compression means 331 and/or to the non-textured foam 301.

In some embodiments, the heating step(s) (e.g., via heating means 311) may be applied to non-textured foam 301, before (and/or during the compression step using compression means 331). In some embodiments, non-textured foam 301 may be heated, prior to the compression step, for about six (6) to about twenty-four (24) hours, plus or minus one hour. Thicker non-textured foam 301 may require lengthier heating times; whereas, thinner non-textured foam 301 may require shorter heating times. In some embodiments, non-textured foam 301 may be heated and/or temperature controlled so its temperature is substantially from 70 degrees Fahrenheit to 90 degrees Fahrenheit, plus five (5) degrees Fahrenheit.

In some embodiments, method 300 may run entirely at room temperatures without any external and/or additional heat means included. In some embodiments, of method 300, heat means 311 may be optional or omitted.

In some embodiments, non-textured foam 301 may have an overall foam height of 6 mm to 15 mm; whereas, foam 200 may have a foam-height 227 of 3 mm to 6 mm, plus or minus one mm.

In some embodiments, compression means 331 may compress non-textured foam 301 from 45 ILD to 85 ILD, plus or minus 5 ILD. ILD (Indentation Load Deflection) may be a value/unit that represents an amount of force/pressure needed to compress a given layer of foam a certain amount (percentage). For example, ILD may be a unit of measurement and may refer to the number of pounds (lbs) of pressure or force that is needed to compress a given layer of foam to a certain predetermined depth by a certain percentage (e.g., 25%). For example, if 30 pounds are required to compress a one inch layer of foam 25%, then its ILD value may be 30.

Figure 4:
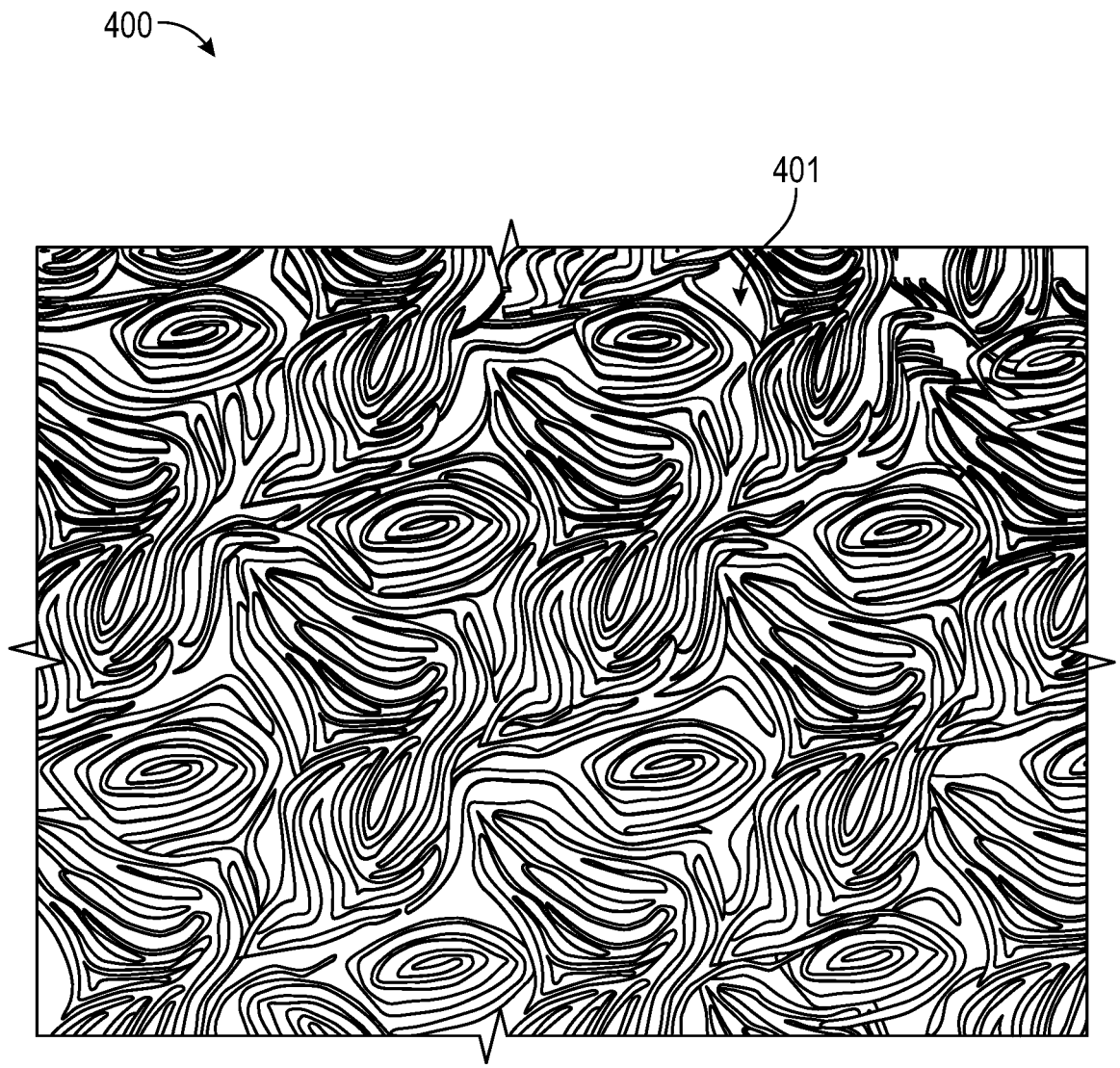
FIG. 4 may depict a portion of a roller that may have an outer textured surface to emboss/imprint a negative of that textured surface to an upper portion of a portion of foam.

FIG. 4 may depict a portion of a roller 400 that may have an outer textured surface 401 to emboss/imprint a negative of that textured surface 401 to an upper surface 201 of a portion of foam 200.

Figure 5A:
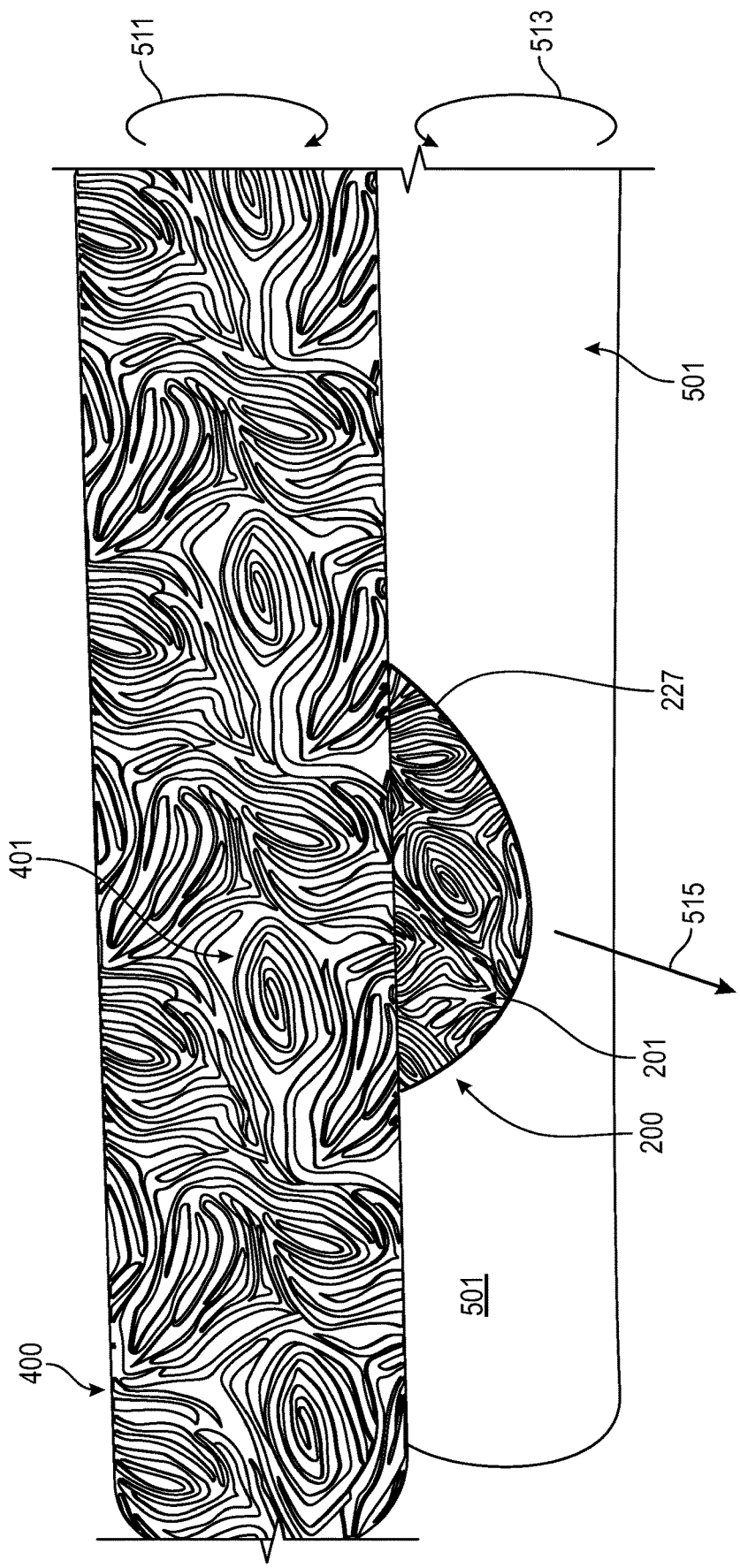
FIG. 5A may depict a pair of rollers extruding a portion of foam that emerges from the rollers with an upper surface textured to simulate (resemble) human fingerprints.

FIG. 5A may depict a pair of rollers (e.g., roller 400 and complimentary roller 501) extruding a portion of foam 200 that emerges from the rollers with an upper surface 201 textured to simulate (resemble) human fingerprints. In FIG. 5A, the pair of rollers may comprise roller 400 and another complimentary roller 501. In some embodiments, the complimentary roller 501 may be substantially flat, planar, smooth, non-textured, non-patterned, combinations thereof, and/or the like. In some embodiments, the complimentary roller 501 may be to help extrude foam-base 205 from the pair of rollers. In some embodiments, these pair of rollers may extrude foam 200 in direction of extrusion 515 (which may be a linear/straight direction away from these rollers), by roller 400 rolling in direction of roller rotation 511 and complimentary roller 501 rolling in direction of roller rotation 513. In some embodiments, roller 400 may rotate in a different rotational direction 511 (e.g., clockwise) than as compared to the direction of roller rotation 513 (e.g., counterclockwise) for complimentary roller 501.

Figure 5B:
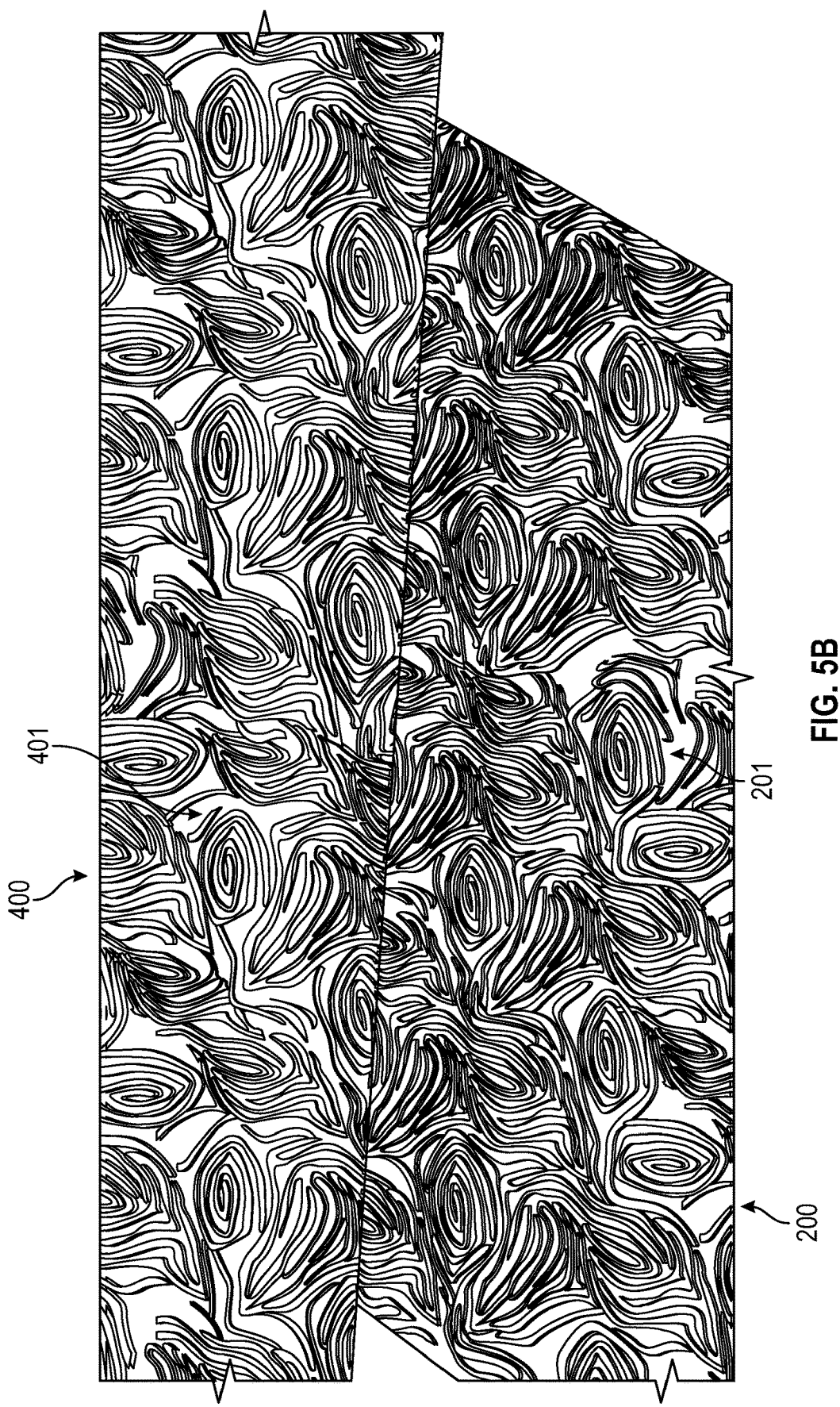
FIG. 5B may depict a closer view of the operations occurring in FIG. 5A.

FIG. 5B may depict a closer view of the operations occurring in FIG. 5A.

Figure 6:
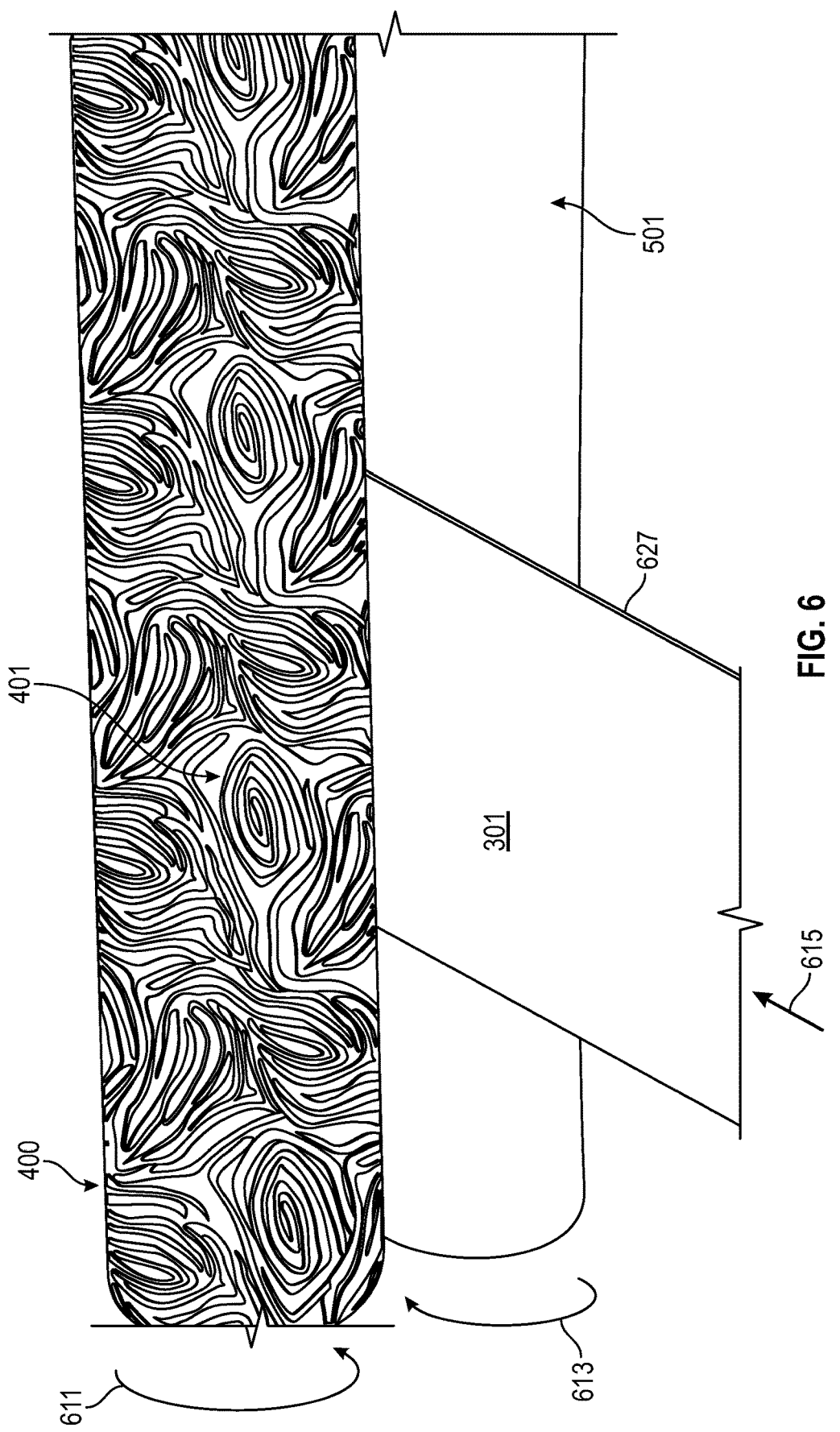
FIG. 6 may depict a rear portion of the operation occurring in FIG. 5A, wherein non-textured foam is fed into the rollers for compression stamping/imprinting.

FIG. 6 may depict a rear portion of the operation occurring in FIG. 5A, wherein non-textured foam 301 is fed into the rollers (e.g., roller 400 and complimentary roller 501) for compression stamping/imprinting. In some embodiments, non-textured foam 301 may have been heated (heat treated) (e.g., via heat means 311) prior to non-textured foam 301 being acted on by the rollers (e.g., roller 400 and complimentary roller 501). In some embodiments, non-textured foam 301 may not have been heated (heat treated) (e.g., via heat means 311) prior to non-textured foam 301 being acted on by the rollers (e.g., roller 400 and complimentary roller 501). In some embodiments, prior to non-textured foam 301 being compressed by the rollers, non-textured foam 301 may have a foam-height 627. In some embodiments, foam-height 627 may be predetermined. For example, and without limiting the scope of the present invention, in some embodiments, foam-height 627 may be in a range from 6 mm (millimeters) to 15 mm. In some embodiments, foam-height 627 may be larger than foam-height 227 (of foam 200). In some embodiments, these pair of rollers may be fed non-textured foam 301 in direction of feed 615 (which may be a linear/straight direction away from these rollers), by roller 400 rolling in direction of roller rotation 611 and complimentary roller 501 rolling in direction of roller rotation 613. In some embodiments, roller 400 may rotate in a different rotational direction 611 (e.g., clockwise) than as compared to the direction of roller rotation 613 (e.g., counterclockwise) for complimentary roller 501.

In some embodiment, the rolling, compression, and/or embossing operations occurring in FIG. 5A, in FIG. 5B, and/or in FIG. 6, may be occurring in the presence of heating means 311.

In some embodiment, the rolling, compression, and/or embossing operations occurring in FIG. 5A, in FIG. 5B, and/or in FIG. 6, may not be occurring in the presence of heating means 311.

Some embodiments of the invention may also be characterized as a system for making a section of textured foam 200 with at least a portion of an upper surface 201 that substantially resembles a look of a human fingerprint, wherein the at least the portion of the upper surface 201 may be configured to provide grip traction between the at least the portion of the upper surface 201 and a hand or a foot of a user of the textured foam. In some embodiments, such a system may comprise: a compression means 331 with a textured imprinting surface 321; a heating means 311; and a section of non-textured foam 301. In some embodiments, the compression means 331 may press the textured imprinting surface 321 into a top surface of the section of the non-textured foam 301, while the heating means 311 may simultaneously (concurrently) provide heat to the compression means 331 and to the section of the non-textured foam 301, such that compression means 331 outputs the section of the textured foam 200 with the at least the portion of the upper surface 201 that substantially resembles the look of the human fingerprint.

Note with respect to the materials of construction, it is not desired nor intended to thereby unnecessarily limit the present invention by reason of such disclosure.

Sections of (cured and non-liquid) textured foam that include at least a portion of an upper surface that substantially resembles a look of a human fingerprint; as well as, methods and systems for making such textured foam have been described. The foregoing description of the various exemplary embodiments of the invention has been presented for the purposes of illustration and disclosure. It is not intended to be exhaustive or to limit the invention to the precise form disclosed. Many modifications and variations are possible in light of the above teaching without departing from the spirit of the invention.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A system for making a section of textured foam with at least a portion of an upper surface that substantially resembles a look of a human fingerprint, wherein the at least the portion of the upper surface is configured to provide grip traction between the at least the portion of the upper surface and a hand or a foot of a user of the textured foam; wherein the system comprises:
a compression means with a textured imprinting surface;
a heating means; and
a section of non-textured foam;
wherein the compression means presses the textured imprinting surface into a top surface of the section of the non-textured foam, while the heating means provides heat to the compression means and to the section of the non-textured foam, such that compression means outputs the section of the textured foam with the at least the portion of the upper surface that substantially resembles the look of the human fingerprint.

2. The system according to claim 1, wherein the non-textured foam is substantially comprised of closed cell ethylene-vinyl acetate foam, irradiation cross-linked polyethylene foam, or combinations thereof.

3. The system according to claim 1, wherein the compression means is selected from one or more of: at least one roller, a stamp, a press plate, or an embossing plate.

4. The system according to claim 1, wherein the heating means is selected from one or more of: an oven, a heated conveyor tunnel, a heat bag, a heat gun, or a heatable room.

5. The system according to claim 1, wherein the section of the textured foam is longer or wider than the section of the textured foam is thick.

6. The system according to claim 1, wherein the at least the portion of the upper surface is comprised of a plurality of alternating ridges and channels.

7. The system according to claim 6, wherein the plurality of alternating ridges and channels substantially resembles the look of the human fingerprint.

8. The system according to claim 6, wherein at least some of the plurality of alternating ridges and channels curve into a whorl pattern.

9. The system according to claim 6, wherein at least some of the plurality of alternating ridges and channels are curved.

10. The system according to claim 1, wherein a thickness of the section of the textured foam is from three millimeters to six millimeters, plus or minus one millimeter.

11. A method for making a section of textured foam with at least a portion of an upper surface that substantially resembles a look of a human fingerprint, wherein the at least the portion of the upper surface is configured to provide grip traction between the at least the portion of the upper surface and a hand or a foot of a user of the textured foam; wherein the method comprises:

compressing a section of non-textured foam with a compression means, wherein the compression means comprises a textured imprinting surface with a negative image that substantially resembles the look of the human fingerprint for imprinting an inverse of the negative image onto at least a portion of a top surface of the non-textured foam, to output the at least the portion of the upper surface of the textured foam that substantially resembles the look of the human fingerprint.

12. The method according to claim 11, wherein the section of the non-textured foam is substantially comprised of closed cell ethylene-vinyl acetate foam, irradiation cross-linked polyethylene foam, or combinations thereof.

13. The method according to claim 11, wherein the compression step occurs simultaneously with a heating step, wherein the heating step causes a heating means to provide heat to the compression means and to also provide heat to the section of the non-textured foam.

14. The method according to claim 13, wherein the heating means is selected from one or more of: an oven, a heated conveyor tunnel, a heat bag, a heat gun, or a heatable room.

15. The method according to claim 13, wherein the heating step heats the section of the non-textured foam to a minimum predetermined temperature.

16. The method according to claim 11, wherein before the compression step occurs, the method comprises a heating step, wherein the heating step causes a heating means to provide heat to the section of the non-textured foam.

17. The method according to claim 16, wherein the heating step heats the section of the non-textured foam to a minimum predetermined temperature.

18. The method according to claim 16, wherein the heating means is selected from one or more of: an oven, a heated conveyor tunnel, a heat bag, a heat gun, or a heatable room.

19. The method according to claim 11, wherein the compression means is selected from one or more of: at least one roller, a stamp, a press plate, or an embossing plate.

20. The method according to claim 11, wherein the at least the portion of the upper surface is comprised of a plurality of alternating ridges and channels that substantially resembles the look of the human fingerprint.

* * * * *